(12) United States Patent
Harrington et al.

(10) Patent No.: US 8,234,205 B1
(45) Date of Patent: *Jul. 31, 2012

(54) METHOD AND SYSTEM FOR ESTABLISHING RIGHTS ASSOCIATED WITH PROPERTY TRANSACTIONS

(75) Inventors: Robert J. Harrington, Framingham, MA (US); David M. Sears, Marlborough, MA (US)

(73) Assignee: Optnow Real Estate Corporation, Framingham, MA (US)

( * ) Notice: Subject to any disclaimer, the term of this patent is extended or adjusted under 35 U.S.C. 154(b) by 1549 days.

This patent is subject to a terminal disclaimer.

(21) Appl. No.: 10/162,288

(22) Filed: Jun. 4, 2002

(51) Int. Cl.
*G06Q 40/00* (2012.01)
(52) U.S. Cl. .......................... 705/37; 705/35
(58) Field of Classification Search .............. 705/35, 705/37
See application file for complete search history.

(56) References Cited

U.S. PATENT DOCUMENTS

| | | | |
|---|---|---|---|
| 6,615,187 B1 * | 9/2003 | Ashenmil et al. ......... | 705/36 R |
| 7,076,452 B2 * | 7/2006 | Florance et al. ......... | 705/26 |
| 7,440,926 B2 * | 10/2008 | Harrington ............. | 705/80 |
| 2002/0052814 A1 * | 5/2002 | Ketterer ............... | 705/35 |
| 2002/0065739 A1 * | 5/2002 | Florance et al. ........ | 705/26 |
| 2004/0220820 A1 * | 11/2004 | Brush et al. ........... | 705/1 |
| 2004/0220823 A1 * | 11/2004 | Brush et al. ........... | 705/1 |

FOREIGN PATENT DOCUMENTS

WO   WO/2004/099927   11/2004

OTHER PUBLICATIONS

Jaskiewicz, Stanley; "Bidding Auctioneers: Negotiating an Agreement"; Jun. 1999; Journal of Trusts and Estates; vol. 130, No. 6, pp. 71-72.
United States Patent and Trademark Office, Notice of Allowance and Fee(s) Due, U.S. Appl. No. 11/052,146, Mailed Aug. 22, 2008.

* cited by examiner

*Primary Examiner* — Muriel Tinkler
(74) *Attorney, Agent, or Firm* — Foley & Lardner LLP

(57) ABSTRACT

A system and method for generating and securing in a broker an interest in future real estate transactions by a client, while reducing a broker's costly and constant pursuit to satisfy current business generation needs. The broker may be a real estate broker, mortgage broker, or some other form of broker offering services related to real estate. A broker network may be provided comprised of a some combination of different types of brokers or several brokers from the same broker firm. The right is a future right associated with an opportunity for the broker to later provide services related to the property, or another property.

36 Claims, 3 Drawing Sheets

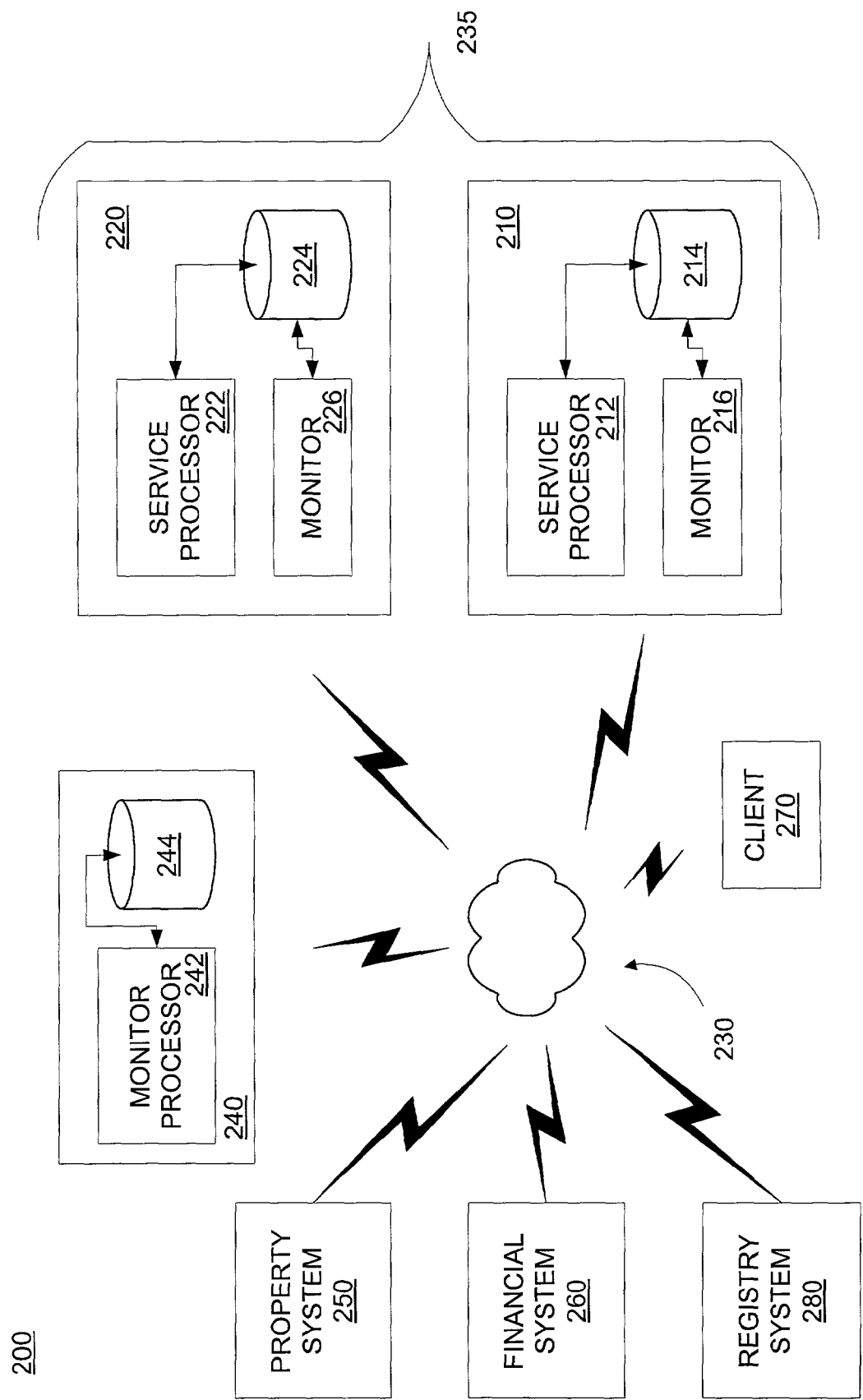

METHOD AND SYSTEM FOR ESTABLISHING RIGHTS ASSOCIATED WITH PROPERTY TRANSACTIONS

FIELD OF THE INVENTION

The inventive concepts generally relate to the field of property transactions, and more specifically to associating options and rights with future property transactions, such as with future real estate transactions.

BACKGROUND

Today, particularly with the expansion of communication means and the Internet, conducting transactions for all types of property has become increasingly easy. There exists many on-line sites wherein a Web host serves to facilitate or broker transactions (e.g., Web auction or reverse auction sites). Meanwhile, traditional means of conducting transactions remain intact. As an example, in today's real estate market, the manner of brokering, marketing, financing and selling real estate is very well established. Whether the real estate is residential or commercial, the approach is similar. That is, real estate brokers and agents (collectively "brokers") spend a great deal of resources, perhaps as much as of 70% of their time, in soliciting potential clients (i.e., property owners) for the opportunity to broker the sale of a subject property (or properties). When the client is ready to sell, the vast majority of clients contract with one (if exclusive) or more real estate brokers to find a buyer and facilitate the transaction. Only a small percentage of property owners sell without a broker, perhaps about 16%. Similarly, mortgage brokers spend a great deal of resources attracting business, but in their case the clients are buyers.

Typically, the client (e.g., a seller) and real estate broker enter into a contract (or brokerage/agency contract) setting out the terms of the representation by the broker/agent, e.g., a broker's commission, a term of representation and exclusivity, if appropriate. The broker usually lists the property, conducts open houses, shows the property by appointment, and assists the client in preparing for the closing, which is where the actual sale and transfer from seller to buyer occurs. In the case of a mortgage broker, the client (e.g., buyer) files a loan application and the mortgage broker facilitates the processing of the mortgage loan in preparation for the closing.

The real estate transaction market is quite large. As an example, data shows that about 5.9 million single family residences were sold in the United States (US) in the year 1999, including about 5.2 million single family homes and 681,000 condos and co-ops. About 800,000 of these were new homes. At the same time, out of a total about 103 million residences in the US, about 71.5 million were single family homes. Including single family homes, multi-family homes, and mobile homes, about 68.8 million of the about 103 million residences were owner occupied. At this same time, as an average, residences turned over about every 12 years, although properties having different demographics turn over at different rates.

In the year 2002, about 5.3 million existing homes are expected to be sold. The median price for January 2002 was about $151,000. Assuming this price throughout the year 2002, real estate transactions will total about $796.3 billion in the US in 2002. About 870,000 new homes are expected to be sold at a median price (in January 2002) of about $226,100, yielding about $196.7 billion in transactions. Therefore, a total of about $993 billion in residential real estate transactions in the US for 2002 is expected. About $834 billion of the $993 billion is estimated to be sold through brokers, yielding a total commission across all brokers of about $41.7 billion, assuming a commission of 5%. Therefore, each one percent of market share for a broker is worth about $417 million dollars annually (in 2002 dollars and projections in the US).

Historically, the trend is for these numbers to increase over time. For instance, about 1.1-1.2 million new households are formed each year It has been estimated that 7.6 million people between the ages or 25 and 34 and 6.7 million people ages 35 to 44 will represent the greatest growth in home ownership through the year 2010 in the US. Home ownership, currently at 66%, is expected to surpass 70% by 2010. While such increases provide more opportunity generally, the reality is that the real estate market, like the economy, tends to be cyclical, not linear. So lulls will be experienced. This general trend of growth and the economic magnitude of the real estate market also draws new players into the market, thereby increasing competition. Therefore, a forecast of general growth does not necessarily equate to stability, security, or predictability for individual brokers or firms. Therefor, the ability to secure future business or to at least establish an association with or stake in future transactions would be beneficial to brokers, but no such ability currently exists.

These issues of market cycles, inability to secure a stake in future transactions (or a market share), and high competitiveness are not limited to real property. The brokering of other forms of property, or services related thereto, can be subject to the same types of challenges. For example, in the case of other types of valuable property, brokers of various types tend to play a role in facilitating transactions and securing financing. Such types of high value property may include art, businesses, race horses, boats, planes, cars, financial instruments or investment opportunities, streams of income, memorabilia, antiques, jewelry, and so on.

The traditional model of property brokering requires a majority of the broker's resources and time to be dedicated to getting listings in the present. However, there has been no significant emphasis on generating and securing a broker's future interest in brokering property or in providing services related to a property. Similarly, for mortgage and loan brokers, there is no present approach to securing an interest in future financing or refinancing opportunities.

Given the monetary magnitude of annual real estate transactions and the predictable increase in real estate values, securing an interest in future real estate transactions could be extremely beneficial for brokers. Similarly, securing a future interest in transactions related to other valuable properties would be beneficial.

SUMMARY OF THE INVENTION

The present invention alleviates the above noted problems in generating and securing for a "holder" party a certain interest or right in future property transactions. The interest or right may or may not be transferable. The holder party is so designated because, pursuant to the invention, that party "holds" the property rights until the occurrence of a condition or set of conditions. The holder party may be a broker, for example, a real estate broker, a mortgage broker, or some other form of broker offering a service related to a subject property. The broker may be part of a broker network, including some combination of different types of brokers, brokers from the same firm, or brokers from different firms. The holder party could also be an auction party, such as an auctioneer who might obtain a conditional right to auction a property (e.g., art, antiques, cars, or horses). A "broker" may not necessarily be a registered or certified "broker" in a jurisdiction, but may be a party performing broker services.

In accordance with the present invention, the holder party compensates a property owner ("client") for a right linked to the property. The right is associated with an opportunity for the holder party to provide services related to the property, typically at some point in the future. In a real estate context, for example, the right acquired by the holder party (from the owner) may be the right to list the property at the time (in the future) the owner wishes to sell the property. The actual brokerage contract at that time may be conventional.

The right transferred by the owner, and acquired by the holder party, is a property right established in a contract between the holder party and the owner. The holder party and the owner exchange consideration at the time of formation of the contract and establishment of the right. The consideration from the holder party may be a fee, credit, service or promise, as examples, or some combination thereof. When the consideration paid by the holder party takes the form of a fee, the fee could be a flat fee or the fee could be determined as a function of a parameter related to the property, market, economy or some other relevant factor. As an example, the fee may be determined as a function (e.g., a percentage) of the property value, e.g., purchase price, desired offering price, market value or assessed value, or a projection thereof.

The fee could be determined, at least in part, as a function of a parameter related to a future transaction associated with the property (e.g., a sale or refinance). In such cases, the fee may be determined as a function of an agreed to broker percentage or commission arising from the future transaction. The fee may be provided in any of a variety of forms. Such forms could include cash back at closing, a reduced interest rate, a credit, or a reduction in points or other closing costs. The fee could be provided in multiple installments, e.g., part up front and the remainder at the time the service is provided (e.g., at the closing). In the split fee or multiple installment arrangement, the value of each installment of the fee could be fixed or variable, or a combination thereof.

Given the forward looking nature of the right and the desire for flexibility by many clients, the right may take the form of an option. Although, in some scenarios the right need not be optional, but may be guaranteed. In other scenarios, the right may be guaranteed for a period of time and then optional for another period of time. For example, the option may be guaranteed for five years and then optional thereafter. In other forms, the option may be required to mature, at which point it is guaranteed. In other forms, the right may be guaranteed under certain conditions and optional under other conditions. For instance, the right may be guaranteed if mortgage interest rates are below a certain percentage and optional if the interest rates are above a certain percentage, or if the market value is above a threshold, rather than below the threshold. As will be appreciated by those skilled in the art, such determinations could be based on multi-variable or multi-factor analysis, and need not be based solely on interest rates or property values. In such cases, different variables or factors could be weighted differently.

In the case where the right is a future option, again in a real estate context, the contract is an option contract. In one form of option contract, the client obtains "up front" money (at the time of the contract) and agrees to use, in the future, an individual broker, broker firm, or any of a set of brokers in a broker network when selling or taking a loan against the property, or when buying a next or additional property, for example. In the case of a broker network, the client is free to use any broker in the broker network that is registered or licensed in the region within which the property is located. As an example, a broker network could include a combination of real estate brokers and mortgage brokers, as well as other service providers. In addition to the broker services, other services may be offered to the client or the client may be designated as a "member" having a variety of member benefits.

The broker right could be a first right of refusal, which could be exercised in conjunction with a planned sale, purchase or loan against the property, or of a future or additional property. In this form, the broker has the option of whether or not to provide services. For instance, if a client (e.g., a seller) can get better terms from a second broker, or outside the broker network, the broker holding the right may have the option of matching the more favorable terms of the second broker and providing the subject broker services. However, if the broker chooses to not match, then the broker may be required to forfeit claims to any future compensation related to the option contract potentially owed by the client.

In order to provide incentive to the client to use the broker in the future, the contract may stipulate that the client must reimburse the broker for any up front consideration (e.g., fee) if later, the client opts out of the contract, uses a broker outside the allowed broker network, or does not use a broker at all (e.g., sells the property without a broker). In such cases, the client may also be required to pay a penalty or an adjustment accounting for the time value of money, or both. The contract could also provide an assent by the client to a lien against the property in the event of a breach of the broker contract (e.g., listing the property with a broker outside of the broker network) or bankruptcy by the client.

BRIEF DESCRIPTION OF THE DRAWINGS

The drawing figures depict preferred embodiments by way of example, not by way of limitations. In the figures, like reference numerals refer to the same or similar elements.

FIGS. 2A and 2B are representative architectures of systems in accordance with the present invention for the generation and transfer of a property right from a client to a broker with respect to a property.

DETAILED DESCRIPTION OF THE PREFERRED EMBODIMENTS

Figure 1:
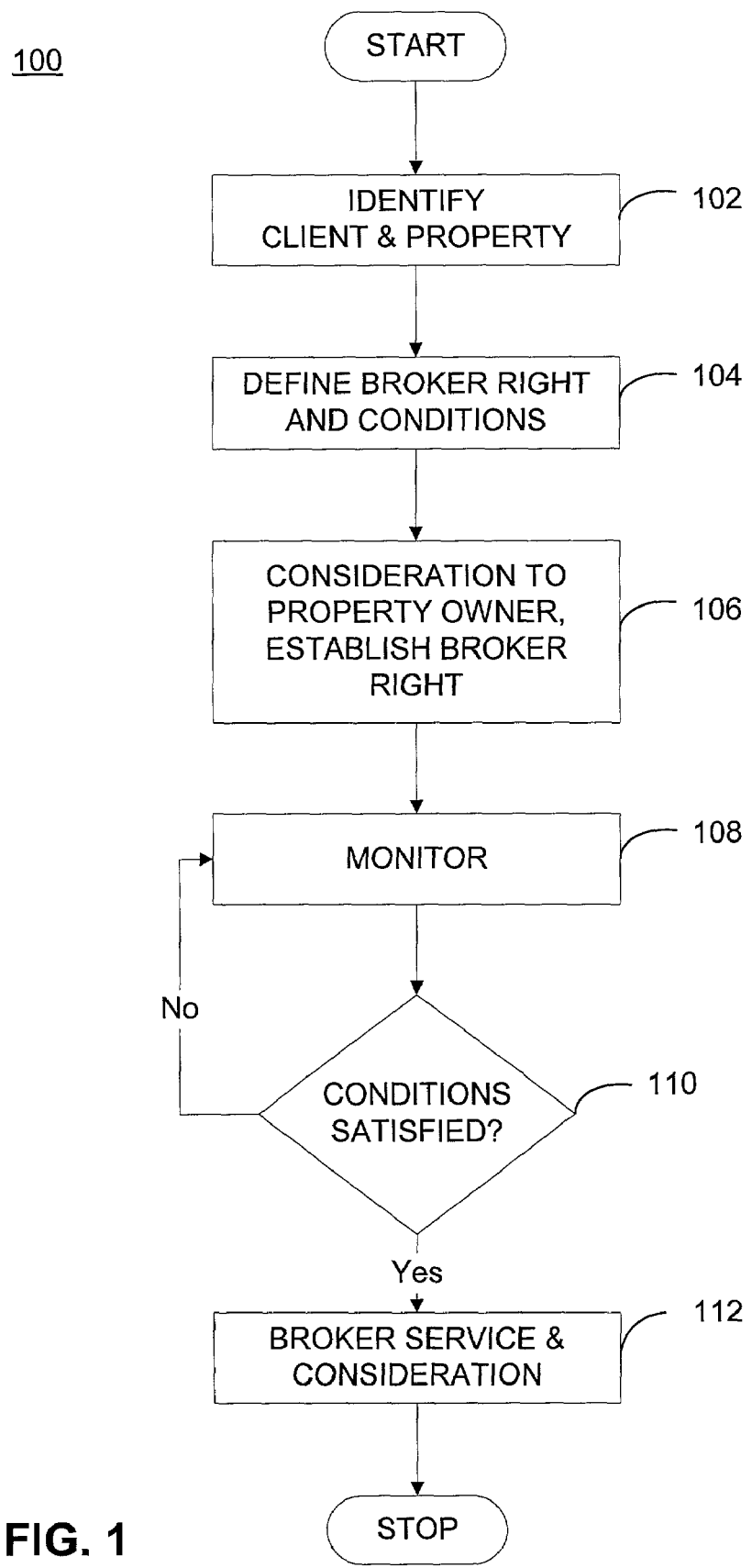
FIG. 1 is a flowchart showing a method in accordance with the present invention for the generation and transfer of a property right from a client to a broker with respect to a property.

The present invention alleviates problems in generating and securing an interest by a "holder party", or his successor, assignee, or designee, (referred to below as a "broker") from a property owner or his successor, assignee, or designee, (referred to below as a "client") in a future transaction related to the owned property. The broker may be a real estate broker, mortgage broker, or some other form of broker offering a service related to the property. The "broker" services associated with the property can take any of a variety of forms, besides real estate or other property brokering services. For example, the services can be mortgage services, landscape services, maintenance services, management services, and the like.

The broker may be part of a broker network, which may be comprised of some combination of different types of brokers or several brokers of the same type. The broker network could be owned and operated by a broker firm and comprised of a plurality of brokers from that firm. When the broker is part of a broker network, the broker entering a contract with the client may be designated as the principal broker. In accordance with the present invention, the broker compensates the client, typically "up front," for a right related to the property. The right is associated with an opportunity for the broker to provide services related to the property at some typically undetermined point in the future. In the preferred form the right is a property right. Typically, the right is conditional, conditioned, for example, on a future action by the client, such as an expressed desire to place the property "on the market."

Preferably, a system and method in accordance with the present invention provides benefits to the broker and client, as well as the broker firm (if any). The future rights retained by the broker secure a future market share, and preferably increases market share in the short term as well. Marketing costs are hopefully reduced and opportunities for selling companion products and services is hopefully increased. The existence of future rights retained by a broker firm may lead to better retention of brokers for the broker firm, as well as make the broker firm attractive to new brokers. In order to further improve retention by broker firms, the terms of the broker contract with the client, and the terms of the employment contract between the broker and broker firm, could be such that if the broker leaves the broker firm, the broker firm retains the broker right.

In some forms, the future right could be a first right of refusal provided to the broker. The broker right could be guaranteed or optional, as described above. The right of first refusal could be related to, and exercised in response to, the client's notice to the broker of an intent to sell, buy, refinance, or take a loan against a property, depending on the type of broker. With the right of first refusal, the broker has the option of whether or not to provide services or to match an offer by a competing broker. For instance, if a client (e.g., a seller) can get better terms from a competing broker, outside the broker network, the broker holding the right of first refusal may have the option of matching the more favorable terms of the competing broker and providing the broker services. However, if the broker chooses not to match, then the broker may be required to forfeit claims to any future compensation related to the option contract potentially owed by the client.

FIG. 1 is a flowchart 100 depicting a method in accordance with the present invention for the generation and securing of a property right for a broker with respect to a property. In step 102, the client and property are identified. The property could be real or personal property, tangible or intangible property. Between the broker and a client, a set of broker rights and a set of associated conditions are defined, in step 104. The client can be an individual, person, trust, corporation, partnership, or other entity. In the preferred form, the client has the role of at least one of an owner, a prospective owner, a seller, or a prospective seller, or an agent thereof. The broker is a service provider, offering services to the client that are related to the property of the client, or for the benefit thereof.

The broker's right depends on the nature of the services offered by the broker, and whatever constraints that are imposed by applicable laws, regulations, licensing boards, and trade practices to the property, client, broker and services, whether local, regional, state-based, provincial, federal, or relating to some other jurisdictional construct. The conditions will typically include client conditions and broker conditions. Broker conditions may be the payment of a fee, or other consideration, to the client and the formation of the broker contract and the providing of the broker's services in the future. Client conditions relate to compensating the broker for its services, if and when provided, and may also include providing notice to the broker of the need for such services, and honoring a broker's first right of refusal. For instance, if the broker is a seller's broker, then a condition may be the client's notice to the broker of the client's intent to sell or market the property. In such cases, the broker's services may include finding a buyer and facilitating the sale of the property. If the broker is a buyer's broker than the condition may be notice to the broker of client's intent to purchase, wherein the service could be to find a next property for the client. If the broker is a mortgage broker, the condition could be notice to the broker by the client of an intent to finance or refinance a property or to take out a home equity loan, wherein the service could be to take and process a loan application and process the loan.

In step 106, a broker contract or similar obligation is formed. Consideration is provided to the client and the broker's right is established via the broker contract. The consideration may take the form of a fee, credit, or discount, as examples, or some combination thereof. For instance, for cash payment at the time of contract formation, the broker may get a first right of refusal to list the client's property when the client decides to sell the property. As another example, the consideration could take the form of a quarter percent interest rate reduction (or a fee) in exchange for a commitment to use the broker (e.g., mortgage broker) for any refinancing of the property, or purchases of other properties. In step 108, monitoring for the client conditions is performed, e.g., notice by the client of the need for the brokers services. If the condition is satisfied, in step 110, the broker performs its service and receives any compensation due according to the broker contract, in step 112.

According to the present invention, the method of generating and securing an interest by a broker in a future property transaction may be implemented in a computer architecture 200, shown in FIG. 2A. As is shown, a broker system 210 may include programs and devices to facilitate performance of the broker services. In such a case, the broker system 210 may include a service processor 212 and associated data 214. When the broker is part of a broker network 235, broker system 210 may be linked to other broker systems, such as broker system 220, which also includes a broker service processor 222 module and an associated database 224.

Systems and devices within the broker network 235 may be accessible by any of a variety of wired or wireless networks 230, including the Internet, Worldwide Web, intranet, extranet, local area network, wide area network, virtual private network, telephone network and so on, or some combination thereof. And, the broker systems 210, 220 may include or be accessible by any of a variety of wired or wireless devices, such as personal computers, workstations, servers, e-mail devices, personal digital assistants, cellular telephones and the like, including computer programs and applications thereof.

A monitor is provided to perform monitoring functions related to the need or trigger for the broker to provide its services. The monitor may be a monitor module 216 (and 226) located, co-located or integral with the broker system 210. Otherwise, the monitor may be part of a relatively standalone monitor system 240, including a monitor processor 242 and database 244. When included, the monitor system 240 may be part of the broker network 235. In other forms, the monitor system 240 and broker system based monitors (e.g., monitors 216, 226) may both be included and cooperate in the monitoring function by sharing and gathering information, sharing or dividing processing tasks, or some combination thereof. Broker contract information and data may be hosted on or be accessible by monitoring system 240, monitors 214, 224, broker systems 210, 220. Such broker contract information includes information detailing the broker contract and terms, such as the property description, contract date, parties, fee arrangement, broker services identification, and client notice requirements.

In any of the above architectures, the monitor system 240 or monitor applications 216, 226 may access, or be accessed by, any of several third party systems in performance or support of the monitoring functions. As an example, such third party systems may include one or more third party property systems 250. The third party property system 250 may include typical real estate listing information, such as property address and listing price, for example. Therefore, if the principal broker is a real estate broker within a broker network and a client lists its property with a broker outside the broker network, the monitor system 240 could query the third party system 250 to obtain the listing information and the principal broker could receive an alert in response to detection of the listing (e.g., an e-mail alert). As examples, third party system 250 could be a multi-listing service (MLS) system, classified ad system, broker system or some combination thereof.

As another example, such third party systems could also include one or more third party financial systems 260. Such financial systems could be systems that provide financial information, generally. For example, financial system 260 may provide general information such as interest rate information, bond market information, stock exchange information and so on, which may be used in monitoring functions if the conditions are related to such financial information. As another example, such financial information may be client related financial information, such as a credit report or rating information for the client. If the client is a corporation, financial information relating to the corporation may be provided, such as stock price, price to earnings ratios, gross annual revenue, and so on. As an example, if the principal broker is a mortgage broker within the broker network and a credit report is performed by another mortgage company or broker on the client, the principal broker could receive an alert notifying of performance of the credit report. Such third party systems could also provide information after the close of the transaction (e.g., the address, date of sale, and sale price, or refinance amount).

As another example, such third party systems could include one or more registry of deeds systems, or like entity systems for recording deeds, mortgages, liens, or other encumbrances related to a property. Such systems are collectively referred to herein as registry 280 in FIGS. 2A and 2B. The broker monitor system 240, or monitor applications 216, 226 could be configured to query such systems to determine of conditions are satisfied or if a transaction unbeknownst to the broker has occurred. Additionally, service processors 212, 222 could be configured to perform recording functions with the registry 280, such as electronic recording, if supported by registry 280.

Figure 2B:
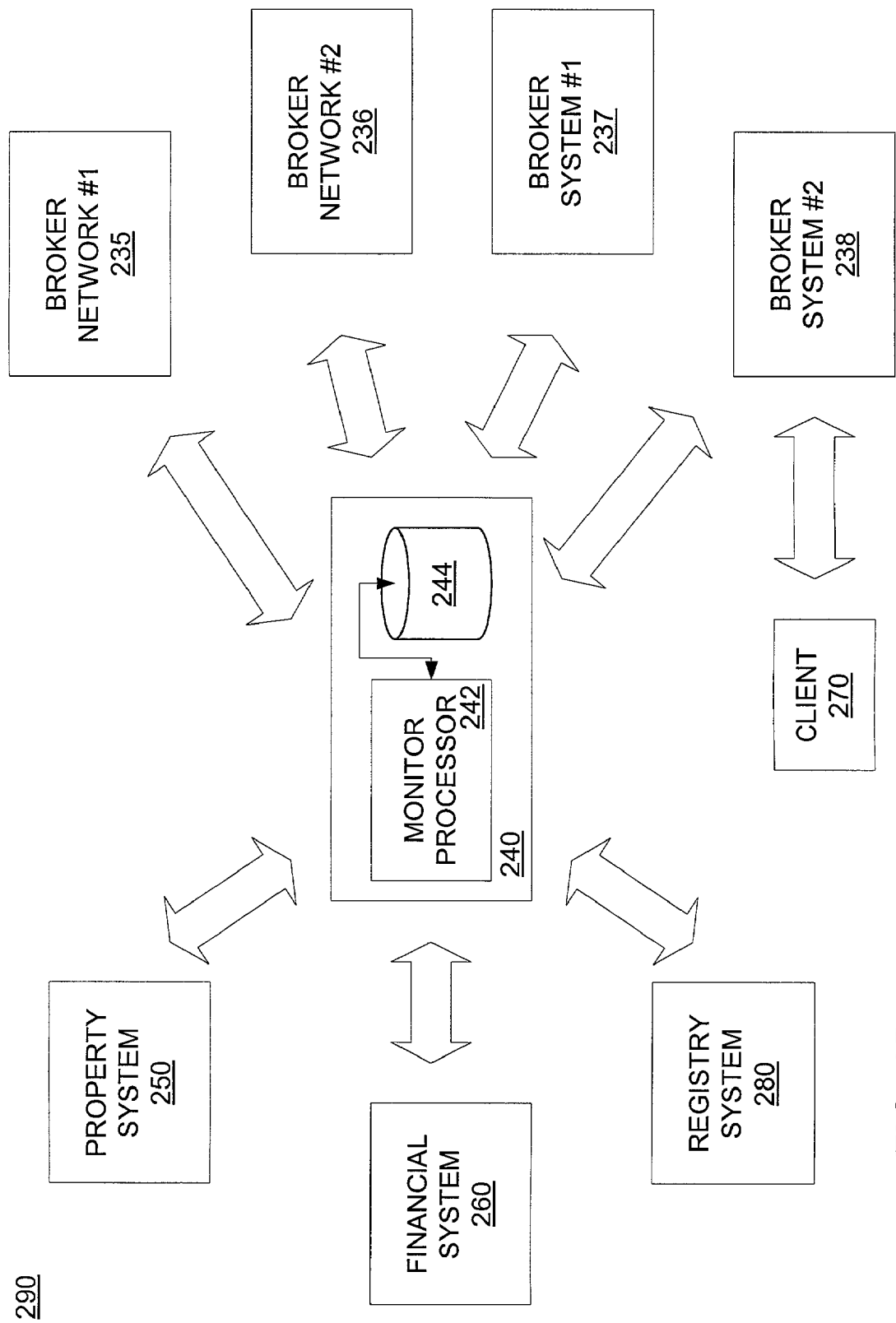

In other embodiments, such as architecture 290 shown in FIG. 2B, the monitoring system 240 may be an independent system that servers a plurality of broker systems, broker networks, or some combination thereof. In this architecture, monitoring system 240 provides monitoring functions for broker network #1 235, broker network #2 236, broker system #1 237, and broker system #2 238. In such cases, monitoring system 240 retains information, or access thereto, about the various broker contracts for each network or system it is monitoring on behalf of. In one form, the monitoring system may require that each broker system 237, 238 and broker network 235, 236 also provide information regarding new clients, so that monitoring system 240 can determine if a new client of one broker has an obligation to a different broker.

In any of the foregoing embodiments, when a client provides notice to a broker in the broker network 235, 236, other brokers in the broker network may receive a corresponding alert message. For instance, the principal broker preferably receives a message if the principal broker was not directly notified by the client of a need for the broker services, but rather another broker in the network received the client's notification. The principal broker could also be alerted by other means, such as telephone or regular mail.

In any of the above architectures, a user interface is preferably provided to allow a client to submit a notice and request for service to a broker or the broker network via a computer and network, such as those previously mentioned. As an example, as is shown in FIG. 2A, client 270 is configured to access one or more of broker systems 210, 220, broker network 235, monitor system 240, and the third party systems 250, 260. Preferably, the user interface is a Web browser interface running on client 270. With respect to FIG. 2B, client 270 and its user interface are configured to access one or more of broker networks 235, 236, broker systems 237, 238, the monitor system 240.

Given the forward looking nature of the broker's right and the desire for flexibility by many clients, the broker's right may take the form of an option secured in an option contract between the broker and client. Although, in some scenarios the right need not be optional, but may be guaranteed. In other scenarios, the right may be guaranteed for a period of time and then optional for another period of time. For example, the option may be guaranteed for five years and then optional thereafter. In other forms, the option may be required to mature, at which point it is guaranteed. In other forms, the right may be guaranteed under certain conditions and optional under other conditions. For instance, the right may be guaranteed if mortgage interest rates are below a certain percentage and optional if the interest rates are above a certain percentage, or if the market value is above a threshold, rather than below the threshold. As will be appreciated by those skilled in the art, such determinations could be based on multi-variable or multi-factor analysis, and need not be based solely on interest rates or property values. In such cases, different variables or factors could be weighted differently.

In one form of option contract, the client agrees to give a specific broker 237, or alternatively any of a set of brokers in broker network 235, the option to provide broker services when, for example, the client seeks to sell the property. In other cases, the option and broker's services relate to the client's purchase of a property. In yet other cases, the option and broker's services relate to the client's desire to refinance the property or to obtain a home equity loan. In other cases, the broker and client may enter into an option contract wherein the client is buying a next or additional property, for example.

When the broker is part of a broker network 235, 236, the contract may be such that the client is free to use any broker in the broker network 235 that is registered or licensed in the region within which the property is located. For instance, such a broker network 235 may include several brokers from the same firm, such as Century 21 for real estate brokers or GMAC Mortgage for mortgage brokers. Depending on the embodiment, broker network 235, 236 may include a combination of real estate brokers and mortgage brokers, and so on. In such cases, the different types of brokers may be from the same firm, or they may be from different firms. For example, a broker network may include Century 21 real estate brokers and GMAC Mortgage mortgage brokers.

In various embodiments, a multi-service broker firm or an affiliation of brokers of different types could form broker network 235, 236. Through these firms and the broker network 235, 236 clients are offered a plurality of types of broker services, such as real estate broker and mortgage broker services. In such cases, several types of broker services could be offered to the client, as well as several types of companion services. For example, if GMAC Mortgage were the broker firm, GMAC Mortgage could offer mortgage broker services as the primary service. Additionally, GMAC could also offer discounts on companion products and services, such as GM cars and GM credit cards, to its clients. In such cases, these discounts may be considered part of the compensation to the client, or they may be considered "membership benefits" for contracting with the broker firm.

The broker right established in the broker contract is a property right. The broker and client provide consideration at the time of formation of the contract and establishment of the broker right. The consideration could be a fee, credit or promise, as examples, or some combination thereof. When the broker's consideration takes the form of a fee, the fee could be a flat fee or the fee could be determined as a function of a parameter related to the property, market, economy or some other relevant factor. As an example, the fee may be determined as a function (e.g., a percentage) of the property value, e.g., purchase price, market value or assessed value.

The consideration to the client could be determined, at least in part, as a function of a parameter related to a future transaction associated with the property (e.g., a sale or refinance). In such cases, the consideration may be a future fee to be paid to the client, which could be in addition to or an alternative to up front consideration (e.g., a cash fee) given to the client. In such a case, the future fee can be determined as a function of an agreed to broker percentage or commission arising from the future transaction. As an example, the consideration could be in the form of a promise by a real estate broker to a purchaser of a property to give the client one percent (1%) of the sale price back to the client at a future closing, if the client uses the real estate broker for the future sale of the property. In the case of a mortgage broker, the future fee could be a flat fee at closing, waiver or delay of the first month's payment, waiver of closing costs, waiver of points, or a rate lock relative to the prime lending rate, as examples. In such cases, the rate lock may be in the form of a rate cap relative to the prime lending rate.

The fee could be provided in multiple installments, e.g., part up front and the remainder at the time the service is provided (e.g., at the closing). In the split fee or multiple installment arrangement, the value of each installment of the fee could be fixed or variable, or a combination thereof. A variable fee is typically tied to a value that is allowed to float, such as interest rates and property value. In one example of a split fee arrangement, the client is paid a flat fee of $150 at the time of contract formation and receives a 1% rebate at a future closing from the broker.

In order to provide incentive to the client to use the broker in the future, the contract may stipulate that the client must reimburse the broker if, later, the client opts out of the contract, uses a broker outside the allowed broker network, or does not use a broker at all (e.g., sells the property without a broker). In such cases, the client may also be required to pay a penalty or an adjustment accounting for the time value of money, or both. The contract could also provide an assent by the client to a lien against the property in the event of a breach (e.g., listing the property with a broker outside of the broker network) or bankruptcy by the client. In either of the above scenarios, or in other scenarios, the client could receive additional incentives (e.g., fees) for referring other clients to the broker.

While the possible scenarios in which the present invention may be applied are too numerous to list herein, some representative scenarios are provided.

Scenario 1. In this scenario, the broker is a real estate broker (i.e., principal broker) and the client is a purchaser or current owner of a property. In this scenario, the broker offers the client a fee (e.g., $150 dollars) at the time of contract formation. Under the broker contract, the client agrees to give the broker the first right of refusal to list the property when and if the owner decides to sell. The client, therefore, also agrees to notify the broker of the client's intent to use the broker's services (i.e., to sell). Consequently, the client receives an up-front payment and the broker receives a future right related to the property. The broker can record the contract with the appropriate registry of deeds (or like entity) to serve notice to other brokers of the right of the principal broker. The broker has secured an interest in a future transaction related to the property, and future market share. When services are performed, the broker is compensated (e.g., by collecting a commission on the sale of the property). The broker contract could also include rights for the broker to provide services to find a next property or additional properties.

Scenario 2. In this scenario, the broker is a mortgage broker and the client is a purchaser or current owner of a property. The broker offers the client a fee (e.g., $150) at the time of contract formation. Under the broker contract, the client agrees to give the broker the first right of refusal to obtain or provide the loan for a refinancing or home equity loan against the property. The client, therefore, also agrees to notify the broker of the client's intent to use the broker's services (i.e., to refinance). Consequently, the client receives an up-front payment and the broker receives a future right related to the property. The broker can record the contract with the appropriate registry of deeds (or like entity) to serve notice to other brokers of the right of the principal broker. The broker has secured an interest in a future transaction, and future market share. When services are performed, the broker is compensated (e.g., by collecting a commission on the loan). The broker contract could also include rights for the broker to provide services to finance a next property or additional properties.

Scenario 3. In this scenario, the broker is an auctioneer of personal property (e.g., cars, antiques, jewelry or art) and the client is a purchaser or current owner of a personal property. The broker offers the client a fee (e.g., $150) at the time of contract formation. Under the broker contract, the client agrees to give the broker the first right of refusal to list the property when and if the owner decides to sell. The client, therefore, also agrees to notify the broker of the client's intent to use the broker's services (i.e., to sell). Consequently, the client receives an up-front payment and the broker receives a future right related to the property. When services are performed, the broker is compensated (e.g., by collecting a commission on the sale of the property). The broker contract could also include rights for the broker to provide services to find a next property or additional properties.

Scenario 4. In this scenario, the broker is a law firm and the property is intangible property (e.g., rights in one or more patents, trademark, copyrighted works) and the client is a purchaser or current owner of the intangible property. The broker offers the client a fee (e.g., $150) at the time of contract formation. Under the broker contract, the client agrees to give the broker the first right of refusal to provide services in furtherance of selling or licensing rights in and to the intangible property. The client, therefore, also agrees to notify the broker of the client's intent to use the broker's services (i.e., to license or sell). Consequently, the client receives an upfront payment and the broker receives a future right related to the property. When services are performed, the broker is compensated for its services.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A database system for storing data representative of attributes of a plurality of properties, each owned by an owner, comprising:
   a computer connected to a property database;
   the property database contains instructions, that when executed perform the following steps:
   identifying data representative of the identity of each of said plurality of properties;
   associating with at least one of said properties, right-to-broker data representative of a conditional right granted by said property's owner to a predetermined party whereby upon the occurrence of a first condition associated with the conditional right, the predetermined party obtains a right to, at his option, elect to broker a transaction or not, related to said property.

2. The database system of claim 1 wherein said plurality of properties includes properties having attributes of real property.

3. The database system of claim 1 wherein said plurality of properties includes properties having attributes of personal property.

4. The database system of claim 1 wherein said plurality of properties includes properties having attributes of tangible property.

5. The database system of claim 1 wherein said plurality of properties includes properties having attributes of intangible property.

6. The database system of claim 1 wherein said transaction related to said property comprises a transaction related to a mortgage.

7. The database system of claim 1 wherein said conditional authorization is conditioned upon the occurrence of a predetermined trigger event.

8. The database system of claim 7 wherein, upon the occurrence of a predetermined trigger event, said authorization by said property's owner to a predetermined party to broker a transaction related to said property comprises authorization to effect a real property listing by, or on behalf of, said predetermined party or its designee or transferee.

9. The database system of claim 7 wherein said predetermined trigger event is outside of the control of the predetermined party.

10. The database system of claim 7 wherein the predetermined party is a party other than said property's owner.

11. The database system of claim 7 wherein the trigger event is the occurrence of notice by said property's owner to said predetermined party of said property's owner's determination to offer to sell said property.

12. The database system of claim 8, wherein the conditional authorization comprises a future right for the predetermined party to offer or to provide to the property owner, at the predetermined party's option, the broker services in response to the trigger event.

13. The database system of claim 12, further comprising a monitor module configured to monitor for the occurrence of the trigger event.

14. The database system of claim 13, further comprising a trigger module in communication with the monitor module and configured to prompt the predetermined party, in response to the trigger event, to optionally offer or provide the broker services.

15. The database system of claim 14, further comprising a network module in communication with the at least one of the monitor module, the trigger module and the property database.

16. The database system of claim 15, wherein the network module is in communication with at least one information source.

17. The database system of claim 16, wherein the monitor module is in communication with the network module to monitor the at least one information source for information indicative of the trigger event.

18. A database system according to claim 1, wherein the identification data includes in association with at least one of said properties, right-to-broker data representative of a conditional right granted by said property's owner to a predetermined party to broker a transaction related to said property whereby
   in the event the predetermined party does elect to broker the transaction,
      [i] upon the occurrence of a second condition associated with the conditional right that the predetermined party brokers the transaction, the predetermined party obtains consideration associated with the transaction.

19. The database system of claim 1 wherein said transaction related to said property comprises a transaction related to a loan.

20. The database system of claim 18 wherein said plurality of properties includes properties having attributes of real property.

21. The database system of claim 18 wherein said plurality of properties includes properties having attributes of personal property.

22. The database system of claim 18 wherein said plurality of properties includes properties having attributes of tangible property.

23. The database system of claim 18 wherein said plurality of properties includes properties having attributes of intangible property.

24. The database system of claim 18 wherein said transaction related to said property comprises a transaction related to a mortgage.

25. The database system of claim 18 wherein said conditional authorization is conditioned upon the occurrence of a predetermined trigger event.

26. The database system of claim 25 wherein, upon the occurrence of a predetermined trigger event, said authorization by said property's owner to a predetermined party to broker a transaction related to said property comprises authorization to effect a real property listing by, or on behalf of, said predetermined party or its designee or transferee.

27. The database system of claim 25 wherein said predetermined trigger event is outside of the control of the predetermined party.

28. The database system of claim 25 wherein the predetermined party is a party other than said property's owner.

29. The database system of claim 25 wherein the trigger event is the occurrence of notice by said property's owner to said predetermined party of said property's owner's determination to offer to sell said property.

30. The database system of claim 26, wherein the conditional authorization comprises a future right for the predetermined party to offer or to provide to the property owner, at the predetermined party's option, the broker services in response to the trigger event.

31. The database system of claim 30, further comprising a monitor module configured to monitor for the occurrence of the trigger event.

32. The database system of claim 31, further comprising a trigger module in communication with the monitor module and configured to prompt the predetermined party, in response to the trigger event, to optionally offer or provide the broker services.

33. The database system of claim 32, further comprising a network module in communication with the at least one of the monitor module, the trigger module and the property database.

34. The database system of claim 33, wherein the network module is in communication with at least one information source.

35. The database system of claim 34, wherein the monitor module is in communication with the network module to monitor the at least one information source for information indicative of the trigger event.

36. The database system of claim 18 wherein said transaction related to said property comprises a transaction related to a loan.

* * * * *